United States Patent
Reimer et al.

(10) Patent No.: US 12,529,920 B1
(45) Date of Patent: Jan. 20, 2026

(54) COMPACT LITHIUM NIOBATE PHOTONIC DEVICES HAVING IMPROVED PERFORMANCE

(71) Applicant: HyperLight Corporation, Cambridge, MA (US)

(72) Inventors: Christian Reimer, Wellesley, MA (US); Prashanta Kharel, Cambridge, MA (US); Mian Zhang, Cambridge, MA (US); Kevin Luke, Cambridge, MA (US); Lingyan He, Brookline, MA (US)

(73) Assignee: HyperLight Corporation, Cambridge, MA (US)

( * ) Notice: Subject to any disclaimer, the term of this patent is extended or adjusted under 35 U.S.C. 154(b) by 364 days.

(21) Appl. No.: 17/976,622

(22) Filed: Oct. 28, 2022

Related U.S. Application Data (60) Provisional application No. 63/273,442, filed on Oct. 29, 2021.

(51) Int. Cl.
  *G02F 1/225* (2006.01)
  *G02B 6/125* (2006.01)
  *G02F 1/035* (2006.01)
  *H04B 10/40* (2013.01)

(52) U.S. Cl.
  CPC ........... *G02F 1/0356* (2013.01); *G02B 6/125* (2013.01); *G02F 1/2255* (2013.01); *H04B 10/40* (2013.01); *G02F 2201/58* (2013.01); *G02F 2202/20* (2013.01)

(58) Field of Classification Search
  CPC ........ G02F 1/035; G02F 1/0356; G02F 1/225; G02F 1/2255; G02F 2201/58
  USPC .......................................................... 385/1–3
  See application file for complete search history.

(56) References Cited

U.S. PATENT DOCUMENTS

| | | | | |
|---|---|---|---|---|
| 7,480,425 B2 * | 1/2009 | Gunn | ................... | G02B 6/4246 385/37 |
| 2006/0159384 A1 * | 7/2006 | Sugiyama | ............. | G02F 1/0356 385/14 |
| 2008/0317399 A1 * | 12/2008 | Sugiyama | ............. | G02F 1/0356 385/3 |
| 2015/0293427 A1 * | 10/2015 | Goi | ........................ | G02F 1/2257 385/3 |
| 2023/0324610 A1 * | 10/2023 | Reano | ..................... | G02F 1/035 385/14 |
| 2024/0159970 A1 * | 5/2024 | Sakai | ..................... | G02B 6/125 |

* cited by examiner

*Primary Examiner* — Robert Tavlykaev

(74) *Attorney, Agent, or Firm* — Van Pelt, Yi & James LLP (57) ABSTRACT

An optical device is described. The optical device includes a substrate, an optical channel, a photodiode and an optical path that couples the channel to the photo diode. The optical path has an optical path length that is at least one fourth of the optical channel length.

22 Claims, 4 Drawing Sheets

FIG. 4B

COMPACT LITHIUM NIOBATE PHOTONIC DEVICES HAVING IMPROVED PERFORMANCE

CROSS REFERENCE TO OTHER APPLICATIONS

This application claims priority to U.S. Provisional Patent Application No. 63/273,442 entitled COMPACT LITHIUM NIOBATE PHOTONIC DEVICES HAVING IMPROVED PERFORMANCE filed Oct. 29, 2021 which is incorporated herein by reference for all purposes.

BACKGROUND OF THE INVENTION

Optical devices, particularly electro-optic devices, are increasingly used in signal transmission. Such optical devices meet certain performance benchmarks, such as a particular minimum optical modulation for a given electrode driving voltage. In order to facilitate operation, low optical and microwave losses are desired for a wide bandwidth of frequencies. In a similar manner with other electronic devices, the total area consumed by the optical device is also desired to be reduced. However, optical connection and electrical connection still must be made to the optical device. Such a combination of characteristics is challenging to achieve in conventional optical devices.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Optical transceivers and other electro-optic devices are generally desired to meet certain performance benchmarks. For example, an optical device is desired to be capable of providing a sufficient optical modulation at lower electrode driving voltages. The optical device is desired to consume a small total area. In addition to the optical device consuming a small area, it is desirable to be able to make optical connection, radio frequency (e.g. RF/microwave) electrical connection, and DC electrical connection to the optical device in order to input signals, output signals, and control operation of the optical device. The optical device is also desired to have low electrode (e.g. microwave) signal losses for the electrical signal through the electrodes and low optical losses for the optical signal traversing the waveguide. Further, the optical devices are desired to be capable of providing the low loss transmission and large modulation at low voltages over a wide bandwidth of frequencies.

An optical device, such as a transmitter portion of an optical transceiver, is described. The optical device includes a substrate, an optical channel having an optical channel length, a photodiode, and an optical path that couples the photodiode to the optical channel. The optical channel may include an electro-optic material having a thickness of at least two hundred nanometers and not more than one thousand nanometers. For example, the optical channel may include lithium niobate and/or lithium tantalate. The optical path (e.g. from the optical channel to the photodiode) has an optical path length that is at least one fourth of the optical channel length.

A method for transmitting optical signals is described. The method includes providing an optical signal to an optical channel of an optical device, such as the transmitter portion of an optical transceiver. The optical device includes a substrate, the optical channel having an optical channel length, a photodiode, and an optical path that couples the photodiode to the optical channel. The optical channel may include an electro-optic material having a thickness of at least two hundred nanometers and not more than one thousand nanometers. For example, the optical channel may include lithium niobate and/or lithium tantalate. The optical path has an optical path length that is at least one fourth of the optical channel length. The method also includes tapping a portion of the optical signal, for example to monitor the optical signal. The portion of the optical signal is provided along the optical path.

In some embodiments of the optical devices and/or method, the optical device includes electrode configured to carry an electronic signal that modifies an optical signal for the optical channel such that the optical device has a Vπ of not more than 4.5 volts for the optical signal in the electrical frequency range of 50-100 GHz. In some embodiments of the optical device and/or method, the monitor photodiode is part of an array of photodiodes having a predetermined arrangement between the photodiodes in the array. In some such embodiments, the optical channel is part of an array including a plurality of optical channels arranged in a first direction. The array of photodiodes is arranged in a second direction different from the first direction. The optical channels may further include a plurality of Mach-Zehnder interferometers, electrode(s), and optical phase shifters. At least one electrode is provided for each of the Mach-Zehnder interferometers. The optical device also has pads including a shared voltage source pad for the optical phase shifters, a shared ground pad for the optical phase shifters and control pads. The control pads include a control pad for each of the optical channels.

In some embodiments of the optical device and/or method, the substrate has a first edge, a second edge opposite to the first edge, a third edge and a fourth edge opposite to the third edge. The optical channels have an input proximate to the first edge and an output proximate to the second edge. The array of monitor photodiodes is arranged along the third edge. In some embodiments, the photodiode is an external photodiode. In such embodiments, the optical device may include an output coupler optically coupled with the optical path and the photodiode. For example, the output coupler may be one or more of a grating coupler configured to output an optical signal in a direction out of plane to the optical path, a spot size converter, or a photonic wire bond. In some embodiments, the substrate includes a silicon substrate and a low microwave dielectric constant layer between the optical channel and the silicon substrate. The low microwave dielectric constant layer has a thickness of at least four micrometers.

The monitor photodiode may be an external photodiode in some embodiments of the optical transceiver and/or method. In such embodiments, the optical device further includes an output coupler optically coupled with the optical path and the photodiode. For example, the output coupler may include a grating coupler configured to output an optical signal in a direction at an angle out of plane from the optical path, or an edge coupler coupling.

In some embodiments, an optical device including a substrate, optical input(s), optical channel(s) coupled to the optical input(s), optical output(s), and photodiode(s) is described. The optical channel is coupled with the optical input(s) and output(s). An optical path that connects the optical channel with the input, output, and photodiode. The optical device has a total optical loss of not more than 10 dB. In some embodiments, the optical device includes at least one electrode for carrying electronic signal(s). The electronic signal(s) modify an optical signal for the optical channel such that the optical device has a $V\pi$ of not more than 4.5 volts for the optical signal in the electrical frequency range of 50-100 GHz. In some embodiments, the optical channel has a length of at least five hundred millimeters. In some such embodiments, the optical channel has a length of at least one centimeter.

Figure 1A:
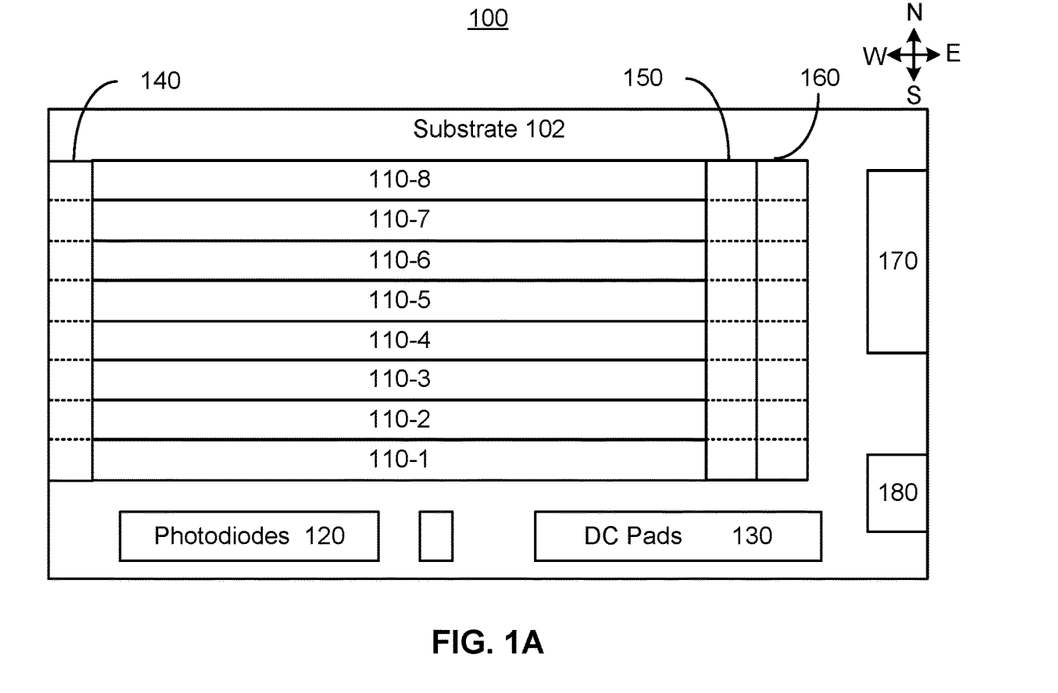
FIGS. 1A-1B depict an embodiment of optical device and an optical transceiver of which the optical device may be a part.
Figure 1B:
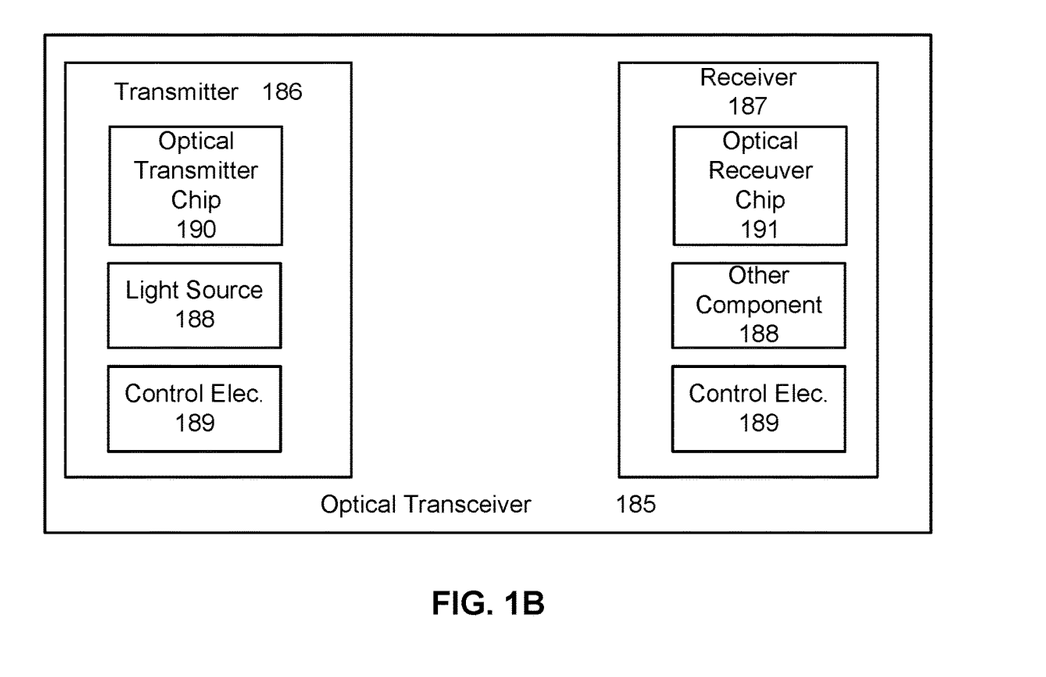

FIGS. 1A and 1B depict a block diagram of an embodiment of optical device 100 and optical transceiver 185 of which optical device 100 may be a part. FIG. 1 is a plan view of optical device 100. Optical device 100 includes substrate 102, optical channels 110-1, 110-2, 110-3, 110-4, 110-5, 110-6, 110-7, and 110-8 (collectively or generically 110), photodiodes 120, DC pads 130, radio frequency (RF) input pads 140, RF termination 150, DC shifters 160, optical output 170, and optical input 180. In some embodiments, other and/or different components may be included.

In some embodiments, optical device 100 is part of optical transceiver 185. Optical transceiver includes transmitter 186 and receiver 187. An optical link (not shown) between two transceivers establishes data communication. Transmitter 186 converts an electrical data signal into an optical signal. Transmitter portion 186 of optical transceiver 185 includes light source (e.g. a laser) 188, control electronics 189, and optical transmitter chip 190. Optical transmitter chip generally includes an optical channel, a high-speed phase shifter (not shown in FIG. 1B) for data modulation, a low-speed phase shifter (also termed a DC phase shifter) (not shown in FIG. 1B) for operation point tuning, an optical output (not shown in FIG. 1B) that couples the light into the transmission channel (e.g. the link), a power splitter (not shown in FIG. 1B) or optical tap (not shown in FIG. 1B), a beam combiner having a complementary port (not shown in FIG. 1B), and a monitor photodiode (not shown in FIG. 1B). However, other and/or different components may be present in some embodiments. The optical tap extracts light with a known relationship to the light coupled to the outputs. In some embodiments the tap removes a portion of the optical signal sent to the output port. In other embodiments the tap is connected to a complementary output of a beam combiner, having a phase conjugated but known correlation to the light coupled to the outputs. Thus, the optical tap may be considered a mechanism for extracting light from some portion of optical device 100 with a known relationship to the light carried by particular portion(s) of device 100. In some embodiments, the optical tap need not have a specific location in optical device 100 or extract a particular portion of the optical signal. The optical tap is also optically coupled to the monitor photodiode. The monitor photodiode monitors the tapped optical signal and generates a signal used for operation point monitoring and control. High-speed and slow electrodes used for the phase shifters have pad regions for wire-bonding. The high-speed phase shifters may include an RF termination to dissipate RF power and reduce reflection. The link transmits the signal over a distance. The link may be a free-space link or optical fiber. The receiver converts the signal back to an electrical signal. Receiver 187 includes optical receiver chip 191 that includes a high-speed photodiode capable of detecting the optical signal with optional additional electronic signal processing. In some embodiments optical receiver chip 191 includes wavelength multiplexing to separate multiple signals on different optical wavelengths. In some embodiments optical receiver chip 191 includes polarization multiplexing to extract signals on different polarizations. In some embodiments receiver chip 191 employs a detector for direct detection. In some embodiments receiver chip 191 employs a laser source as a local oscillator for coherent detection. Other and/or different components may be part of transmitter 186 and/or receiver 187. The combination of transmitter 185 and receiver 187 forms the transceiver. The transmitter and receiver may be part of the same chip or may be separate chips or devices. Optical device 100 may be part of optical transmitter 186. More specifically, optical device 100 may be used in the transmitter chip 190 and/or 191.

Referring to FIG. 1A, one or more optical signals are input via optical input 180, carried on optical channels 110, and output via optical output 170. Although a single optical input 180 is shown, multiple inputs may be present. Further, the number of optical inputs 180 may differ from the number of optical outputs 170. While a single optical output 170 is shown, multiple outputs may be present. Furthermore, the number of outputs may differ from the number of channels 110. Thus, optical device 100 may be tailored to accommodate a varying number of inputs 170, signals using single or multiple (e.g., multiplexed) wavelengths, another number of channels 110, and/or a different number of outputs 180. For example, optical device 100 may be a 1in-4channel-4out device (i.e. one input split to four channels and each channel having a dedicated and individual output), a 1in-4channel-2out device, a 2in-4channel-2out device, a 2in-4channel-1out device, a 1in-4channel-1out device, a 1in-8channel-8out device, a 1in-8channel-4out device, a 2in-8channel-8out device, a 2in-8channel-4out device, a 4in-8channel-2out device, or a device having another configuration. In some embodiments, the optical wavelength for multiple inputs is the same. In some embodiments, the optical wavelengths at the inputs are different. In some embodiments multiple channels 110 are multiplexed into a smaller number of outputs using wavelength multiplexing. In some embodiments channels 110 are multiplexed into a smaller number of outputs using polarization multiplexing. In some embodiments channels 110 are multiplexed into a smaller number of outputs using waveguide couplers. Although eight optical channels 110 are shown, in some embodiments, another number may be used. Thus, optical device 100 may have a variety of configurations, including but not limited to DR4, DR8, FR4, and/or dual polarization IQ (DPIQ) modulators. Further, in the embodiment shown, optical channels 110 are straight. In some embodiments, optical channels 110 include Mach-Zehnder interferometers. Optical channels 110 may be considered functional elements used to imprint an electronic signal on an optical carrier. Consequently, each optical channel 110 may include a waveguide (which may include a splitter, two waveguides and a combiner), a mechanism for shifting one or both of the split beam(s), and one or more electrodes for modulating the optical signal. For simplicity, the waveguide, shifting mechanism, and electrodes are not shown in FIG. 1A.

In some embodiments, the waveguide for each optical channel 110 includes at least one optical material possessing an electro-optic effect. In some embodiments, the optical material(s) are nonlinear. As used herein, a nonlinear optical material exhibits the electro-optic effect and has an effect that is at least (e.g. greater than or equal to) 5 picometer/volt. In some embodiments, the nonlinear optical material has an effect that is at least 10 picometer/volt. In some such embodiments nonlinear optical material has an effect of at least 20 picometer/volt. In some embodiments, the waveguides for optical channels 110 are low optical loss waveguides. For example, the waveguides may have a total optical loss of not more than 10 dB through the portion of waveguide in proximity to the electrodes. In some embodiments, each waveguide has a total optical loss of not more than 8 dB. In some embodiments, the total optical loss is not more than 4 dB. In some embodiments, the total optical loss is less than 3 dB. In some embodiments, the total optical loss is less than 2 dB. In some embodiments, the waveguide has an optical loss of not more than 3 dB/cm (e.g. on average). In some embodiments, the nonlinear material in the waveguide has an optical loss of not more than 2.0 dB/cm. In some such embodiments, the waveguide has an optical loss of not more than 1.0 dB/cm. In some embodiments, the waveguide has an optical loss of not more than 0.5 dB/cm. In some embodiments, the nonlinear optical material in waveguide 110 includes lithium niobate (LN) and/or lithium tantalate (LT). In some embodiments, the nonlinear optical material for waveguide 110 consists of LN. In some embodiments, the nonlinear optical material for waveguide 110 consists of LT.

The total optical loss of the optical device 100 may be defined as the total sum of accumulated loss from the optical inputs 180, to the optical outputs 170 with all components on the optical devices configured such that the total loss is minimal (e.g. interferometers are biased at maximum transmission). In embodiments with multiple inputs and outputs, total optical insertion loss is the difference between the sum of the optical input power on all inputs and the sum of all optical output power on all outputs when optical device 100 is configured for minimal losses. Stated differently, the total optical loss for optical 100 may be considered to be the total power input to optical inputs 180 minus the total power to optical outputs at maximum transmitted power. As an example, in an embodiment of optical device 100 with two inputs and 8 outputs, where two input lasers with 10 dBm optical power are coupled into the optical device at the inputs, and 2 dBm of optical power is measured at each of the devices 8 outputs, then the total optical loss is 4 dB (2×10 dBm−8×2 dBm=4 dBm) for the optical device 100. In some embodiments, the total optical loss of optical device 100 is of not more than 12 dB. In some embodiments, the total optical loss of optical device 100 is of not more than 10 dB. In some embodiments, the total optical loss of optical device 100 is of not more than 8 dB. In some embodiments, the total optical loss of optical device 100 is of not more than 6 dB. In some embodiments, the total optical loss of optical device 100 is of not more than 5 dB. In some embodiments, the total optical loss of the optical device is of not more than 4 dB. In some embodiments, the total optical loss of the optical device is of not more than 3 dB. In some embodiments, these total optical losses may be achieved in the 50-100 GHz frequency range for the optical signals in optical channels 110. Thus, optical device 100 may have a low total optical loss, particularly as compared to devices formed with another material such as Si. For example, the total loss for an 800G DR8 silicon may generally be above 12 dB. If configured similarly (e.g. as an 800G DR8 with 2 lasers), optical device 100 has a total optical loss of below 10 dB. If one laser is used, such a DR8 formed by optical device 100 may have a total optical loss below 7-8 dB. If configured as a dual-polarization IQ (1 input into 4 channels and then into one output), optical device 100 may have a total optical loss of less than 10 dB (e.g. not exceeding 7-8 dB in some embodiments). In contrast, the total optical loss for a silicon or InP DP IQ is approximately 12-13 dB. In some embodiments, optical channels 110 each has a length of at least five hundred millimeters. In some embodiments, optical channel 110 has a length of at least one centimeter. In some embodiments, optical channel 110 has a length of at least two centimeters. Other lengths (e.g. at least three centimeters or more, as described with respect to FIG. 4) are possible.

In some embodiments, the nonlinear optical material for the waveguide for each optical channel 110 is formed as a thin film. For example, the thin film may have a thickness of not more than three multiplied by the optical wavelengths for the optical signal carried in the waveguide before processing. In some embodiments, the thin film has a thickness of not more than two multiplied by the optical wavelengths. In some embodiments, the nonlinear optical material has a thickness of not more than one multiplied by the optical wavelength. In some embodiments, the nonlinear optical material has a thickness of not more than 0.5 multiplied by the optical wavelengths. For example, the thin film may have a total thickness of not more than three micrometers as-deposited. In some embodiment, the thin film has a total thickness of not more than two micrometers. The high confinement portion of the waveguide may be formed of the thin film or may be formed by a ridge on the thin film. In some embodiments, the waveguide (i.e. the thin film and/or ridge) has a thickness of not more than one thousand five hundred nanometers. In some embodiments, the waveguide has a thickness of not more than one thousand nanometers. In some embodiments, the waveguide has a thickness of not more than five hundred nanometers. In some embodiments, the thickness of the waveguide is not more than four hundred and fifty nanometers. In some such embodiments, the thickness of the waveguide is not more than (nominally) four hundred nanometers. In some embodiments, the waveguide has a thickness of not more than three hundred nanometers. In some such embodiments, the waveguide has a thickness of not more than two hundred nanometers. In some embodiments, the waveguide has a thickness of not more than one hundred and fifty nanometers. In some embodiments, the waveguide is at least eighty nanometers thick. The waveguide may be at least two hundred nanometers thick. The thin film nonlinear optical material may be fabricated into the waveguide utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (RIE), inductively coupled plasma RIE. In some embodiments, a chemical etch and/or electron beam etch may be used. The waveguide may thus have improved surface roughness. For example, the sidewall(s) may have reduced surface roughness. For example, the short range root mean square surface roughness of a sidewall of the ridge may be less than ten nanometers. In some embodiments, this root mean square surface roughness is not more than five nanometers. In some cases, the short range root mean square surface roughness does not exceed two nanometers.

The low total optical losses described herein, for example at the lengths for optical channels 110 described herein, may be due in part to the low surface roughness of the waveguides of optical channels 110. As discussed above, fabrication of the electro-optic material for optical channels 110 results in low short range surface roughness for the sidewalls of the waveguide even when materials such as LN and/or LT are used. Consequently, transmission of the optical signals through the waveguides of optical channels 110 may exhibit reduced losses. These low losses may be achieved over a wide range of frequencies (e.g. 50-100 GHz for the signal in the electrode). Further, the materials used (e.g. thin film LN and/or LT) have a large electro-optic effect (i.e. higher modulation for a given voltage). Further, the use of thin films and electrodes described herein allow for enhanced electric field at the waveguide. Consequently, reduced Vπ, (e.g. in the ranges discussed herein) may be possible for optical devices 100 having low losses over a wide range of frequencies and, in some embodiments, longer waveguides (e.g. in the length ranges described herein).

A microwave signal may be delivered to the electrodes for each optical channel 110 using the RF inputs 140 and RF termination 150. The RF electrodes, which include RF inputs 140 (e.g. at one end of the RF electrodes), are separated to mitigate electrical cross talk, the separation distance is defined as the separation between adjacent signal lines. For example, the RF electrodes (and thus RF inputs 140) may have a separation distance of at least two hundred micrometers. In some embodiments, the RF electrodes may have a separation distance of at least five hundred micrometers. In some embodiments, RF electrodes have a separation distance of not more than seven hundred and fifty micrometers. For example, one of the RF electrodes and/or inputs 140 may have a separation distance from an adjacent RF input 140 by approximately five hundred micrometers. DC shifters 160 may be used to shift the optical signals. In some embodiments DC shifters 160 are heaters applied to one or both waveguides of optical channels 110. In some embodiments, DC shifters may be electro-optic shifters. DC pads 130 are used to make electrical connection to and control DC shifters 160. Optical ports 170 and 180 are also shown as residing on the opposite edge from RF inputs 140.

Photodiodes 120 are used to monitor the optical signals through optical channels 110. In some embodiments photodiodes 120 are placed on top of the substrate 102 and are illuminated through vertically emitted light out of the substrate, e.g., by making use of grating couplers or scatterers. In some embodiments the photodiodes are placed on the substrate and are illuminated from the edge, e.g., through spot size converters. In some embodiments the photodiodes are connected with the tap through photonic wire bonds. However, other techniques for placing photodiodes 120 and/or other mechanisms for coupling light to the photodiodes may be utilized in other embodiments. In some embodiments, the outputs of optical channels 110 are tapped. For example, not more than one percent, not more than three percent, not more than five percent or not more than ten percent of the optical signal may be split from optical channels 110 and routed to photodiodes 120. For clarity, the taps for optical channels 110 are not shown in FIG. 1A. In some embodiments, photodiodes 120 are external photodiodes. For example, a pre-fabricated array of photodiodes 120 may be affixed to substrate 102. In some embodiments, photodiodes in the array may be spaced apart by regular (e.g. equal) intervals. In some embodiments, the spacing between photodiodes in the array may vary. Thus, the term "array" may include a regular array and an irregular array (e.g., including random spacing of photodiodes). The array of photodiodes 120 may be arranged in the East-West direction (the first photodiode furthest East, with the last photodiode furthest West) on substrate 102. Thus, photodiodes 120 are arranged perpendicular to the direction that optical channels 110 are arranged (e.g. 110-1 through 110-8 are South-North) and parallel to the axis of optical channels 110. In such embodiments, an output coupler (not shown in FIG. 1) couples the tapped optical signal from each optical channel 110 to a corresponding one of the photodiodes 120.

In the embodiment shown, optical channels 110 are straight and can be seen as running in the East-West direction of substrate 102. The array of optical channels 110 may be viewed as aligned in the North-South direction (i.e. optical channel 110-1 is furthest South, while optical channel 110-8 is furthest North). Thus, the waveguides for optical channels 110 do not cross. Further, optical channels extend from one (East) edge of substrate 102 to the opposing (West) edge of substrate 102. RF termination 150 and DC shifters 160 for also lie along the optical channels 110. The overlap of optical channels 110 and components 150 and 160 are indicated by dotted lines. The overlap of optical channels 110 and RF inputs 140 is also shown by dotted lines. In the embodiment shown, the optical input 180 and output 170 are along the same (West) edge, opposite from RF inputs 140. Optical output 170 is in line with optical channels 110. However, optical input 180 may be closer to DC pads 130 for more effective routing of optical signals. Photodiodes 120 and DC pads 130 are along the bottom (South) edge. Thus, optical channels 110 may be seen as traversing substrate 102 in the East-West direction, while photodiodes 120 and DC pads 130 lie along the south edge. In other embodiments, photodiodes 120 and DC pads 130 may lie along different edges. DC pads 130 are desired to be in proximity to DC shifters 160 to simplify electrical connection between DC pads 130 and DC shifters 160. Similarly, photodiodes 120 may be in proximity to RF inputs 140 in order to obviate space and layout issues due to the tapped optical signal and DC interconnects being located in the same region of optical device 100.

In some embodiments, optical channels 110 lie along the long axis of substrate 102. In such embodiments, the East-West direction is the long axis. Thus, waveguides for optical channels 110 also lie along the long axis of substrate 102. This orientation allows the length of straight channels (and the waveguides therein) to be maximized. In other embodiments, waveguide(s) for optical channels 110 may bend.

Optical device 100 may not only have improved performance, but may also be more compact. As discussed herein, optical device 100 may have low total optical losses (e.g., not more than 10 dB or not more than 8 dB) and low V$\pi$ over a wide range of frequencies (e.g. 50-100 GHz). Because of the layout of components of optical device 100, the area of optical device may be reduced. A more compact optical device is generally desirable. In some embodiments, waveguides (not shown) from the tap of the waveguide in each channel 110 to the monitor photodetectors 120 do not cross any optical waveguides. The waveguides of optical channels 110 have a longest available length if optical channels 110 are fabricated along the long axis of substrate 102. Consequently, a larger modulation may be achieved. Because of the arrangement of components of optical device 100, layout of interconnects, waveguides and other structures may be simplified. This may improve fabrication. Moreover, pads 130, photodiodes 120, RF inputs 140 and optical ports 170 and 180 may be more readily accessible. Because materials such as LN and/or LT are used, the length of waveguides for optical channels 110 may be reduced for a given desired optical modulation. Low losses in optical device 100 may reduce the requirements of the laser (or other optical source) providing an input optical signal. In some embodiments, fewer lasers may be used than in other technologies (e.g. silicon photonics). The use of LN and/or LT may also reduce the magnitude of the voltage used for the desired modulation. This may reduce or eliminate the driver and control requirements. The improved optical signal quality of optical device (e.g. power, signal fidelity, etc.) may also impact the receiver (not shown) couple to optical output 170. For example, a different detector and/or less signal processing may be required by the received. Thus, a reduction in size may be achieved while maintaining or improving performance. In some embodiments, the number of optical inputs 170 may be different from the number of optical channels 110 and/or the number of optical outputs. For example, because waveguides in optical channels 110 have low losses, input signals may be split without adversely affecting performance of optical device 100. Consequently, various configurations of optical device 100 are possible.

Figure 2:
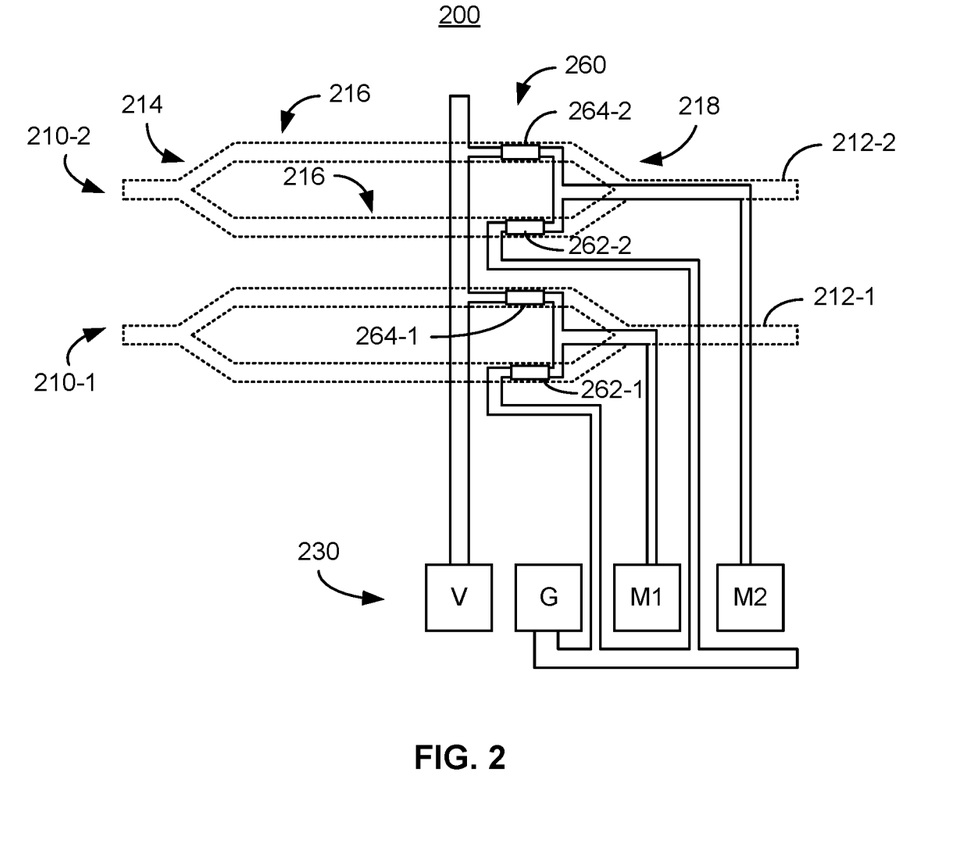
FIG. 2 is diagram depicting a portion of an embodiment of an optical device that may be used in an optical transceiver.

FIG. 2 is diagram depicting a portion of an embodiment of optical device 200, which may be part of an optical transceiver, such as optical transceiver 185. FIG. 2 is not to scale. Optical device 200 is analogous to optical device 100 and includes analogous components. Optical device 200 includes optical channels 210-1 and 210-2 (collectively or generically optical channels 210), photodiodes (not shown), DC pads 230, radio frequency RF inputs (not shown), RF termination (not shown), DC shifters 260, optical output (not shown), and optical input (not shown) that are analogous to optical channels 110, photodiodes 120, DC pads 130, RF inputs 140, RF termination 150, DC shifters 160, optical output 170, and optical input 180, respectively. In some embodiments, other and/or different components may be included. Although only two optical channels 210, two DC shifters 260, and pads 230 for two DC shifters 260 are shown, another number may be present. For example, four or eight optical channels 210, four or eight sets of DC shifters 260, and pads 230 for four or eight sets of DC shifters 260 may be present.

Optical channels 210 explicitly include waveguides 212-1 and 212-2 (collectively or generically 212). Because waveguides 212 are on a different level of optical device 200 than wiring for DC shifters 260, waveguides 212 are depicted by dotted lines. The lengths of waveguides 212 depicted in FIG. 2 are for explanatory purposes only. In general, the length of waveguides is significantly greater than indicated in FIG. 2. As can be seen in FIG. 2, waveguides 212 include a splitter 214, waveguide arms 216 and combiner 218. For simplicity, only the components of waveguide 212-2 are labeled. Waveguides 212 may be formed of analogous material (e.g. lithium niobate and/or lithium tantalate) and analogous geometries (e.g. thicknesses, lengths, and/or widths) as described for optical channels 110.

In the embodiment shown in FIG. 2, interconnects and other wiring for DC shifters 260 may not cross. Thus, optical device 200 has no metal-metal crossing for DC shifters 260. DC shifters 260 include heaters 262-1 and 264-1 for waveguide 210-1 and heaters 262-2 and 264-2 for waveguide 210-2. Heaters 262-1 and 262-2 and heaters 264-1 and 264-2 are termed heaters 262 and 264 collectively or generically. Further, DC shifters 260 share common ground pad G and voltage source pad V. To individually control heaters 262 and 264, each optical channel 210-1 and 210-2 has a corresponding pad M1 and M2, respectively. Thus, heaters 262-1 and 264-1 for channel 210-1 are controlled by pad M1. Heaters 262-2 and 264-2 for optical channel 210-2 are controlled via pad M2. Additional optical channels (not shown) and additional DC shifters (not shown) are provided with voltage source, ground and control in an analogous manner. For example, for eight Mach-Zehnder interferometers using sixteen heaters, ten pads 230 would be provided. Although shown as sharing a common ground and voltage source pad, in other embodiments, DC shifters 260 may be configured differently. For example, DC shifters may have a common ground but separate drivers for each heater. Such an embodiment would utilize one ground and then a separate port for each heater. For an embodiment including eight Mach-Zehnder interferometers, there would be seventeen pads for sixteen heaters.

Optical device 200 shares the benefits of optical device 100. In addition, as indicated by the configuration of DC pads 230 and DC shifters 260, the wiring for DC shifters 260 does not cross. This may simplify fabrication of optical device 200. Further, because common ground and voltage source pads (V and G) are used, the number of pads required to control DC shifters 260 may be reduced. For example, only ten pads may be needed for eight optical channels. Thus, optical device 200 may be made more compact while allowing electrical connection to pads to be more readily accomplished.

Figure 3:
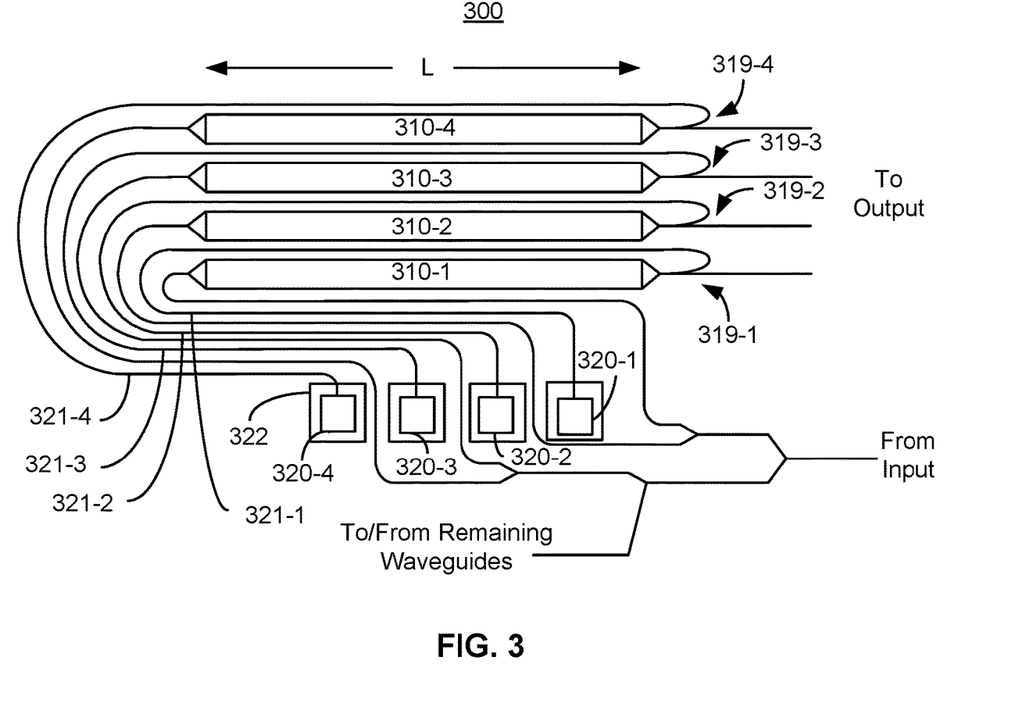
FIG. 3 is diagram depicting a portion of an embodiment of an optical device that may be used in an optical transceiver.

FIG. 3 is diagram depicting a portion of an embodiment of optical device 300, which may be part of an optical transceiver, such as optical transceiver 185. FIG. 3 is not to scale. Optical device 300 is analogous to optical device(s) 100 and/or 200. Thus, optical device 300 includes analogous components. Optical device 300 includes optical channels 310-1, 310-2, 310-3, and 310-4 (collectively or generically optical channels 310), monitor photodiodes 320-1, 320-2, 320-3, and 320-4 (collectively or generically photodiodes 320), DC pads (not shown), radio frequency RF inputs (not shown), RF termination (not shown), DC shifters (not shown), optical output (not shown), and optical input (not shown) that are analogous to optical channels 110, photodiodes 120, DC pads 130, RF inputs 140, RF termination 150, DC shifters 160, optical output 170, and optical input 180, respectively. For example, optical channels 310 may include waveguides that are formed of analogous material (e.g. lithium niobate and/or lithium tantalate) and have analogous geometries (e.g. thicknesses, lengths, and/or widths) as described for optical channels 110. In some embodiments, other and/or different components may be included. Although only four optical channels 310 and four photodiodes 320 are shown, another number may be present. For example, eight optical channels 310 and eight photodiodes 320 may be present. In some embodiments, the number of photodiodes may differ from the number of optical channels. In some such embodiments, not every optical channel may be monitored.

Taps 319-1, 319-2, 319-3, and 319-4 (collectively or generically 319) are shown. In the embodiment shown, taps 319 are taken near the outputs of optical channels 310, after optical signals in the arms of waveguides 310 have been combined. The combiner (not specifically shown in FIG. 3) may be a y-splitter, MMI or directional coupler. In such embodiments, taps 319 are used to extract a small amount of the light that is now in the combined waveguide, prior to being transmitted to the output. Thus, the light in each tap 319 has a direct correlation to the light in the port going to the output. In some embodiments, a combiner with more than one output port (frequently two) is used. For example, the combiner may be an MMI, directional coupler of 2×2 waveguide combiner. In this case the light in the two ports is the phase conjugate (i.e., if the intensity in one port is a maximum, the intensity in the other port is minimal such that the sum of the intensities in the two ports is equal). In such embodiments, taps 319 may simply route the output of the complementary port to the monitor (e.g., photodiode). Thus, taps 319 may have a variety of configurations and may simply be considered some mechanism for extracting light for monitoring.

Instead of being routed to photodiodes that are located nearby, taps 319-1, 319-2, 319-3, and 319-4 follow optical paths 321-1, 321-2, 321-3, and 321-4 (collectively or generically 321), respectively, to photodiodes 320-1, 320-2, 320-3, and 320-4. Optical paths 321 may be waveguides formed of analogous material (e.g. lithium niobate and/or lithium tantalate) and with analogous geometries (e.g. thicknesses, lengths, and/or widths) as described for waveguides in optical channels 110. In the embodiment shown, optical channels 310 have a length, L. The optical path followed by taps 319 is at least one-fourth of L in some embodiments. In the embodiment shown, the optical path is longer than optical channels 310. Despite the longer optical path for taps 319, sufficient signal is monitored at photodiodes 320 because waveguides for optical channels 310 have significantly reduced optical losses.

Also shown in FIG. 3 are optical couplers 322, of which only one is labeled. Optical couplers 322 couple the optical signal from optical paths 321 to photodiodes 320. In some embodiments, photodiodes 320 are external photodiodes mounted on a surface of a substrate (not explicitly labeled) for optical device 300. In some such embodiments, photodiodes 320 are part of an array. For external photodiodes 320, optical couplers 322 may be grating couplers having a spacing analogous to that of photodiodes 320 (e.g. two hundred and fifty micrometers). Such output gratings 322 may output the tapped optical signal out of the plane of optical device 300. For example, in some cases, the tapped optical signal is output in a direction substantially perpendicular to (e.g. within ten degrees of perpendicular) the direction of travel in optical paths (e.g. out of the plane of the page of FIG. 3). Other optical couplers may be used in other embodiments.

Because of the configuration depicted in optical device 300, optical paths 321 between taps 319 and photodiodes 320 are distal from the optical input(s) (not shown in FIG. 3). As a result, interference between taps 319 and the optical input(s) is reduced. In addition, because photodiodes 320 may be located in a manner analogous to photodiodes 120, electrical connection to photodiodes 320 may be made without interfering in electrical connection made to DC pads (not shown in FIG. 3) that are analogous to DC pads 230. Similarly, electrical connection may be made to photodiodes 320 without interfering in connection made to RF inputs (not shown in FIG. 3). The use external photodiodes 320 may facilitate making electrical connection to photodiodes 320.

Figure 4A:
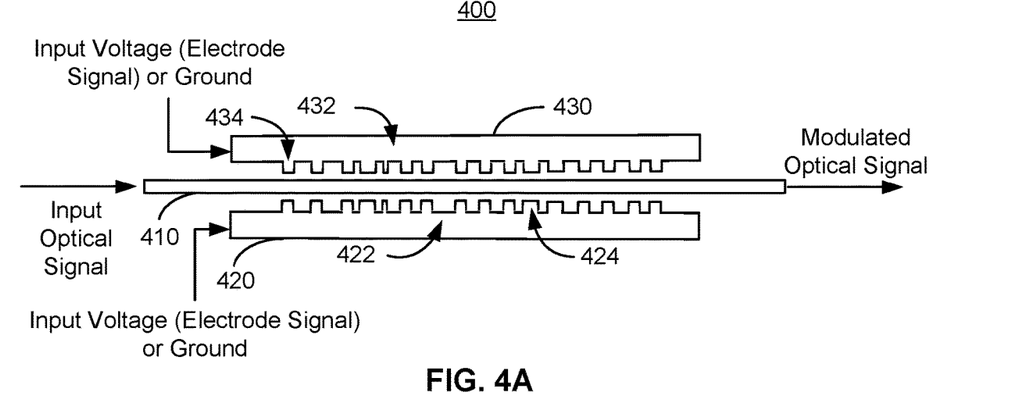
FIGS. 4A-4B depict embodiments of portions of optical devices that may be used in optical transceivers.
Figure 4B:
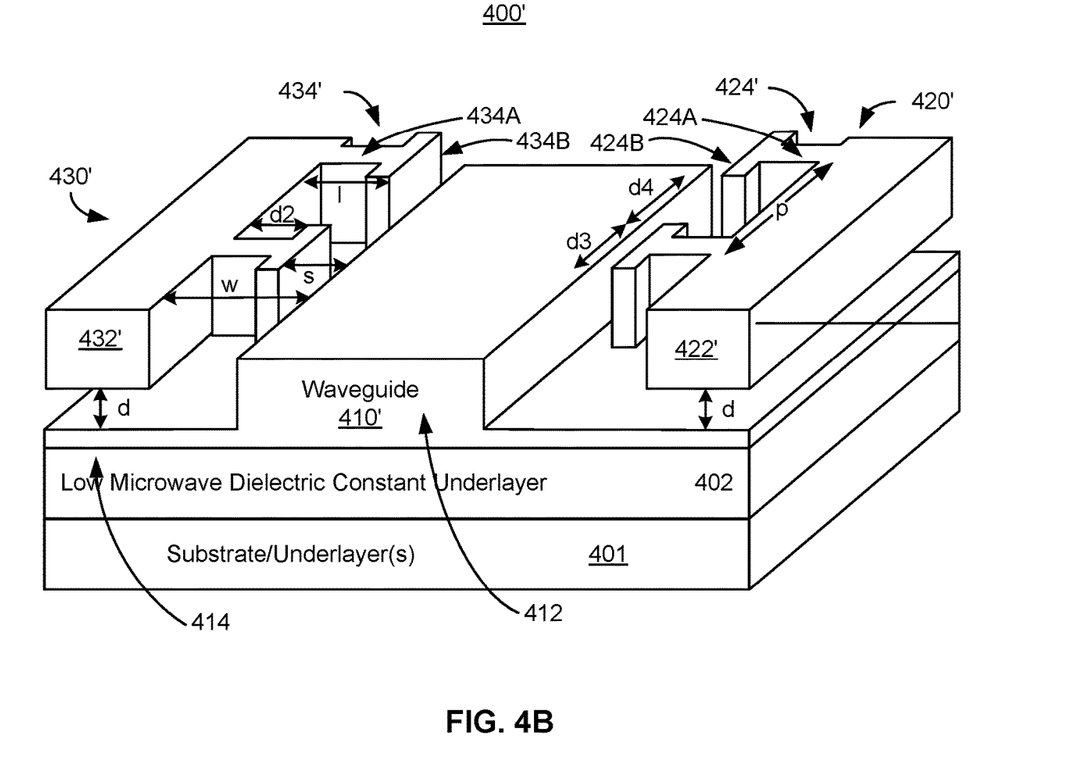

FIGS. 4A-4B depict embodiments of a portion of optical devices 400 and 400'. FIG. 4A depicts a plan view of optical device (i.e. electro-optic device) 400 including waveguide 410 and electrodes 420 and 430. FIG. 4B depicts a perspective view of optical device 400' which is analogous to optical device 400. In particular FIGS. 4A and 4B depict portions of the waveguide and electrode(s) that may be used in optical channels 110, 210 and/or 310 of optical devices 100, 200, and/or 300.

Optical devices 400 and 400' may be part of an optical modulator or other devices with an electro-optic response (e.g. in picometers per volt) in the thin film plane (e.g. x-cut or y-cut lithium niobate) or perpendicular to the thin film plane. In other embodiments, an optical device may be part of an optical modulator with an electro-optic response (e.g. in picometers per volt) out of plane of the thin film plane (e.g. z-cut lithium niobate). Optical devices may be part of an optical transceiver, such as optical transceiver 185.

Referring to FIG. 4A, optical device 400 includes waveguide 410 and electrodes 420 and 430. Waveguide 410 is used to transmit an optical signal. More specifically, waveguide 410 receives an input optical signal and outputs a modulated optical signal. Electrode(s) 420 and/or 430 carry an electrode signal that applies a time varying electric field to waveguide 410. This electric field alters the index of refraction of waveguide 410. In some embodiments, electrode 420 carries an electrode signal, such as a microwave signal, while electrode 430 is a ground. In some embodiments, electrode 430 carries an electrode (e.g. microwave) signal, while electrode 420 is ground. In some embodiments, both electrodes 420 and 430 carry electrode signals. Other configurations are also possible. Thus, electrodes 420 and 430 combine with waveguide 410 to provide a modulated optical signal. Electrodes 420 and 430 are drawn around waveguide 410 to indicate that waveguide 410 experiences an applied electric field between 420 and 430, but does not indicate the physical locations of electrode 420 and 430. For example, it is possible to have electrode 420 directly on top or below the waveguide while 430 is on one side.

Waveguide 410 is depicted as a having a rectangular footprint and extending only between electrodes 420 and 430. Waveguide 410 may have other configurations. For example, waveguide 410 may include a thin film portion that may extend under electrode(s) 420 and/or 430 and a ridge 412 between electrodes 420 and 430. Waveguide 410 includes at least one optical material possessing an electro-optic effect as described above and may include LN and/or LT.

In some embodiments, waveguide 410 is a low optical loss waveguide. For example, waveguide 410 may have a total optical losses described above with respect to FIG. 1. In some embodiments, the nonlinear optical material for waveguide 410 consists of LN. In some embodiments, the nonlinear optical material for waveguide 410 consists of LT. Such nonlinear optical materials may have inert chemical etching reactions for conventional etching using chemicals such as fluorine, chlorine or bromine compounds. In some embodiments, the nonlinear optical material(s) include one or more of LN, LT, potassium niobate, gallium arsenide, potassium titanyl phosphate, lead zirconate titanate, and barium titanate. In other embodiments, other nonlinear optical materials having analogous optical characteristics may be used. Waveguide 410 may also have an analogous geometry (e.g. thicknesses, lengths, and/or widths) to those described for waveguides in optical channels 110.

Various other optical components may be incorporated into waveguide 410 to provide the desired phase modulation, polarization modulation, intensity modulation, IQ modulation, other modulation and/or other functionality. For example, waveguide 410 may have wider portion(s) (not shown in FIG. 4A) for accommodating multiple modes and narrower portions for coupling to optical fibers. In some embodiments (not shown in FIG. 4A), waveguide 410 may include splitters to divide the optical signal into multiple branches for modulation and recombine the modulated optical signals for output. Thus, waveguide 410, as well as electrodes 420 and 430, may be configured to provide the desired functionality.

A portion of waveguide 410 is proximate to electrodes 420 and 430 along the direction of transmission of the optical signal (e.g. from the input of the optical signal through waveguide 410 to the modulated optical signal output). This portion of the waveguide may have a variety of lengths. In some embodiments, the portion of waveguide 410 close to electrodes 420 and 430 is at least two millimeters in length. In some embodiments, this portion of waveguide 410 is at least five millimeters and not more than ten millimeters long. Other embodiments may have this portion of the waveguide 410 longer. The portion of waveguide 410 proximate to electrodes 420 and 430 may have a length greater than two centimeters. In some embodiments, the length of the portion of waveguide 410 proximate to electrodes 420 and 430 is at least 2.5 cm. In some embodiments, the length of this portion of waveguide 410 is at least three centimeters. Such lengths are possible at least in part because of the low optical losses per unit length for waveguide 410 described above. Because waveguide 410 can be made longer, the total optical modulation may be provided through the electric field generated by electrodes 420 and 430 may be larger. Further, because of the low optical losses and low microwave losses (described below), the desired optical modulation (e.g. change in index of refraction) may be achieved with a signal input to the electrode(s) 420 and/or 430 having a lower voltage. For example, $V\pi$ is the half wave voltage, or the amplitude of the input electrode signal required to shift the phase of the optical signal by $\pi$. In some embodiments, $V\pi$ is not more than six volts for electrode signals in the 50-100 GHz range. In some embodiments, $V\pi$ is not more than 4.5 volts for electrode signals in the 50-100 GHz range. In some embodiments, $V\pi$ is not more than three volts for signals in the 50-100 GHz range. In some embodiments, $V\pi$ is on the order of voltages provided via CMOS circuitry, for example in the range of 0.5 volts through 4.5 volts for signals in the 50-100 GHz range. For example, $V\pi$ may be not more than 4.5 volts at ten GHz. Thus, $V\pi$ is not more than 4.5 volts in some embodiments. In some such embodiments, $V\pi$ is not more than 4 volts for signals in the 50-100 GHz range. Other voltages for other frequency ranges are possible. Thus, performance of optical modulator 410 may be improved.

Further, the portion of waveguide 410 proximate to electrodes 420 and 430 may have an optical mode cross-sectional area that is small. In some embodiments, the optical mode cross-sectional area is less than 3 multiplied by the square of the wavelength of the optical signal in the nonlinear optical material(s) (e.g. $\lambda^2$). In some embodiments, the optical mode cross-sectional area is less than 2 multiplied by the square of the wavelength of the optical signal in the nonlinear optical material(s). In some embodiments, the optical mode cross-sectional area is less than 4.5 multiplied by the square of the wavelength of the optical signal in the nonlinear optical material(s). In some embodiments, the optical mode cross-sectional area is less than 4 $\mu m^2$. In some such embodiments, the optical mode cross-sectional area is not more than 3 $\mu m^2$. In some embodiments, such a small optical mode cross-sectional area may be provided using thin films and fabrication technologies described herein. The optical mode cross-sectional area may also allow for the low optical losses described herein.

Electrodes 420 and 430 apply electric fields to waveguide 410. Electrode 420 includes a channel region 422 and extensions 424 (of which only one is labeled in FIG. 4A). Electrode 430 includes a channel region 432 and extensions 434 (of which only one is labeled in FIG. 4A). In some embodiments, extensions 424 and/or 434 may be omitted from electrode 420 and/or electrode 430, respectively. Extensions 424 and 434 protrude from channel regions 422 and 432, respectively. Thus, extensions 424 and 434 are closer to waveguide 410 than channel region 422 and 432, respectively, are. Extensions 424 and 434 shown in FIG. 4A are simple rectangular protrusions. In some embodiments, extensions 424 and 434 may have a different shape. For example, extension(s) 424 and/or 434 may have an L-shaped footprint, a T-shaped footprint and/or another shaped footprint. Regardless of the shape, at least part of each of the extensions 424 and 434 is closer to waveguide 410 than channel regions 422 and 432, respectively. The distribution (e.g. pitch) and width of extensions 424 and 434 are also irregular. In some embodiments, the distribution and/or width of extensions 424 and/or 434 may be regular. The distance between waveguide 410 and extensions 424 and 434 is shown as constant. In some embodiments, this distance may vary. Similarly, the distance between waveguide 410 and channel 422 and 432 is shown as constant. In some embodiments, this distance may vary. Electrodes 420 and 430 are shown as symmetric. In some embodiments, electrodes 420 and 430 are asymmetric. For example, extensions 434 may be omitted, while extensions 424 are present.

Extensions 424 and 434 protrude from channel regions 422 and 432, respectively, and reside between channel regions 422 and 432, respectively, and waveguide 410. As a result, extensions 424 and 434 are sufficiently close to waveguide 410 to provide an enhanced electric field at waveguide 410. Consequently, the change in index of refraction induced by the microwave signal carried in electrodes 420 and/or 430 is increased. In contrast, channel regions 422 and 432 are spaced further from waveguide 410 than the extensions 424 and 434. Thus, channel region 422 is less affected by the electric field generated by electrode 430/ extensions 434. Electrical charges have a reduced tendency to cluster at the edge of channel region 422 closest to electrode 430. Consequently, current is more readily driven through central portions channel region 422 and the electrode losses in channel region 422 (and electrode 420) may be reduced. Similarly, channel region 432 is further from electrode 420. Channel region 432 is less affected by the electric field generated by electrode 420/extensions 424. Electrical charges have a reduced tendency to cluster at the edge of channel region 432 closest to electrode 420. Consequently, current is more readily driven through channel region 432 and the electrode losses in channel region 432 (and electrode 430) may be reduced. Because microwave signal losses through electrodes 420 and 430 may be reduced, a smaller driving voltage may be utilized for electrode(s) 420 and/or 430 and less power may be consumed by optical device 400. In addition, the ability to match the impedance of electrode 420 with an input voltage device (not shown in FIG. 4A) may be improved. Such an impedance matching may further reduce electrode signal losses for optical device 400. Moreover, extensions 424 and 434 may affect the speed of the electrode signal through electrodes 420 and 430. Thus, extensions 424 and 434 may be configured to adjust the velocity of the electrode signal to match the velocity of the optical signal in waveguide 410. Consequently, performance of optical device 400 may be improved.

Electrode(s) 420 and/or 430 may be fabricated using deposition techniques, such as evaporation and/or electroplating, and photolithography to shape extensions 424 and/or 434 of electrode120 and/or 430. The resulting electrode 420 and/or 430 may have a lower frequency dependent electrode loss. In some embodiments, the frequency dependent electrode power loss for a particular frequency window (e.g. at least 40 GHz) in a frequency range between DC and five hundred GHz can be as low as 0.8 dB per square root of the electrode signal frequency per centimeter, where the electrode signal frequency is measured in GHz. The frequency dependent electrode loss is less than 0.5 dB per square root of an electrode signal frequency per centimeter in other embodiments. The electrode signal frequency is measured in GHz and the frequency window may be at least 40 GHz. The frequency dependent electrode loss is less than 0.3 dB per square root of an electrode signal frequency per centimeter in other embodiments. The electrode signal frequency is measured in GHz and the frequency window may be at least 40 GHz. In some embodiments, the electrode has an absorption electrode loss for a frequency window in an electrode signal frequency from DC to not more than five hundred GHz. The absorption electrode loss is less than 0.005 dB per GHz per centimeter and the frequency window is at least 40 GHz in some embodiments. In some embodiments, the frequency dependent electrode power loss for the same frequency window and frequency range can be as low as 0.75 dB per square root of the electrode signal frequency per centimeter for the particular frequency window (e.g. 40 GHz or more). In some embodiments, the electrode has an absorption electrode loss. In some embodiments, the absorption electrode loss a particular frequency window (e.g. 40 GHz or more) in a frequency range between DC and five hundred GHz is less than 0.02 dB per GHz per centimeter. In some embodiments, the absorption electrode loss for the same frequency window and frequency range is less than 0.005 dB per GHz per centimeter for the frequency window in the frequency range of DC and five hundred GHz. In some embodiments, optical device 400 may include an additional electrode, such as a DC electrode (not shown in FIG. 4A).

Such an additional electrode may be used to optimize optical device 400 for low-frequency response. This electrode may include one or more of an electro-optic, a thermal phase shifter and or MEMS shifter.

In operation, an optical signal that is desired to be modulated is input to waveguide 410. An electrode signal, e.g. a microwave signal, is also applied to electrode(s) 420 and/or 430. For the purposes of explanation, it is assumed that the microwave signal is applied to electrode 420, while electrode 430 is ground. The time varying microwave signal through electrode 420 causes charges of a particular sign rapidly accumulate in an extension 424, drop back to zero in the extension 424, and charges of the opposite sign rapidly accumulate in the extension 424. A lack of negative charges in a particular extension 424 is considered the same as positive charges accumulating in the extension 424, and vice versa. This cycle is repeated at or around the frequency of the microwave signal. As a result of the accumulation of charges in extension 424, opposite charges accumulate in the corresponding extensions 434 nearby. A relatively large time varying electric field is generated between extensions 424 and 434. Because the electro-optic material in waveguide 410 is exposed to a larger time varying electric field, the index of refraction for waveguide 410 undergoes larger changes near extensions 424 and 434. The optical signal is exposed to larger variations in index of refraction as the optical signal traverses waveguide 410 and passes extensions 424 and 434. Thus, a larger modulation in the optical signal may be achieved for a microwave signal of a given voltage amplitude applied to electrode 420. For example, optical device 400 may provide sufficient optical modulation at frequencies of up to 400-300 GHz or higher with a voltage amplitude of not more than one volt provided to electrode 420. Further, as discussed above, the presence of extensions 424 reduces the tendency of current to cluster near the edge of channel region 422 closer to waveguide 410 and mitigates losses in electrode 420. Current may be more readily driven through channel region 422 at a lower voltage and microwave losses reduced. Thus, performance of optical device 400 may be improved.

In addition, as discussed above, optical device 400 may not only reduce optical losses through waveguide 410, but also increase modulation of the optical signal through the use of a longer waveguide 410. Use of electrodes 420 and 430 having extensions 424 and 434, respectively, may reduce microwave losses, allow for a large electric field at waveguide 410/ridge 412 and improve the propagation of the microwave signal through electrodes 420 and 430, respectively. Electrodes 420 and 430 may also improve performance via velocity and phase matching. Consequently, performance of optical device 400 may be significantly enhanced.

FIG. 4B is a perspective view of optical device 400'. Optical device 400' is analogous to optical device 400. Consequently, analogous portions of optical device 400' are labeled similarly. Optical device 400' includes waveguide 410', electrode 420' and electrode 430' that are analogous to waveguide 410, electrode 420 and electrode 430, respectively. Also shown is substrate/underlying layers 401. In some embodiments, substrate 401 includes a silicon substrate and a silicon dioxide layer between the silicon substrate and waveguide 410. Other substrates may be used in other embodiments. In some embodiments, substrate 401 is a dielectric having a low microwave dielectric constant, for example a microwave dielectric constant of less than eleven. In some embodiments, the substrate has a microwave dielectric constant of less than eight. In some such embodiments, the substrate has a microwave dielectric constant of less than five. For example, substrate 401 may include sapphire, quartz and/or fused silica. In some embodiments, underlayer(s) 402 with a low microwave dielectric constant such as silicon dioxide, may be used on top of substrate 401. Other and/or additional underlayer(s) may be used in other embodiments. Further, low microwave dielectric constant underlayer(s) may be used in conjunction with other substrates with larger microwave dielectric constant. For example, a low microwave dielectric constant underlayer 402 of silicon dioxide may be provided on a substrate 401 that has a microwave dielectric constant greater than eleven, such as silicon or LN. In some embodiments, the underlayer provided is desired to be thick. For example, the underlayer may be at least three micrometers thick and not more than one hundred micrometers thick. In some embodiments, low microwave dielectric constant layer 402 has a thickness of at least four micrometers. In some embodiments, layer 402 has a thickness of at least five micrometers and not more than fifty micrometers. In some embodiments, layer 402 is not thicker than twenty micrometers.

Further, other geometric configurations of substrate and/or underlayers may be used in some embodiments.

Waveguide 410' is used to transmit an optical signal. Waveguide 410' includes a ridge 412 and a thin film portion 414. In the embodiment shown in FIG. 4B, thin film portion 414 and ridge portion are formed from the same material (e.g. from the same thin film). Waveguide 410' may be formed of analogous materials as waveguide 410 and may have analogous performance.

Waveguide 410' may have a different configuration in some embodiments. For example, waveguide 410' may omit thin film portion 414 or reduce the size of thin film portion 414. Ridge 412 may have another configuration. For example, ridge 412 may be trapezoidal, semicircular, stacked rectangular and/or have another geometry that guides the optical signal in a manner analogous to that which is described herein. Other and/or additional materials may be used. In some embodiments, different portions of waveguide 410' are formed from different materials. For example, thin film portion 414 and ridge 412 may be formed of different materials. Thin film 414 may include a nonlinear optical material such as LN and/or LT, while ridge 412 may be formed of a passive material such as silicon and/or silicon nitride. In some embodiments, ridge 412 may be located below thin film portion 414 (e.g. ridge 412 may be between thin film portion 414 and an underlying substrate 401). Similarly, various other optical components may be incorporated into waveguide 410' to provide the desired phase modulation, polarization modulation, intensity modulation, IQ modulation, other modulation and/or other functionality. In some embodiments (not shown in FIGS. 4B-1C), waveguide 410 may include splitters to divide the optical signal into multiple branches for modulation and recombine the modulated optical signals for output. Thus, waveguide 410, as well as electrodes 420 and 430, may be configured to provide the desired functionality.

In some embodiments, the nonlinear optical material for waveguide 410' is formed as a thin film. For example, the thin film may have a thickness (e.g. of thin film portion 414 and ridge portion 412) of not more than three multiplied by the optical wavelengths for the optical signal carried in waveguide 410' before processing. In some embodiments, the thin film has a thickness (e.g. of thin film portion 414 and ridge portion 412) of not more than two multiplied by the optical wavelengths. In some embodiments, the nonlinear optical material has a thickness of not more than one multiplied by the optical wavelength. In some embodiments, the nonlinear optical material has a thickness of not more than 0.5 multiplied by the optical wavelengths. For example, the thin film may have a total thickness of not more than three micrometers as-deposited. In some embodiment, the thin film has a total thickness of not more than two micrometers. Other thicknesses, including but not limited to those described in the context of optical channels 110, may be used. The thin film nonlinear optical material may be fabricated into waveguide 410' utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (RIE), inductively coupled plasma RIE. In some embodiments, a chemical etch and/or electron beam etch may be used. Waveguide 410' may thus have improved surface roughness. For example, the sidewall(s) of ridge 412 may have reduced surface roughness. For example, the short range root mean square surface roughness of a sidewall of the ridge 412 is less than ten nanometers. In some embodiments, this root mean square surface roughness is not more than five nanometers. In some cases, the short range root mean square surface roughness does not exceed two nanometers. Thus, waveguide 410' may have the optical losses in the range described above. In some embodiments, the height of ridge 412 is selected to provide a confinement of the optical mode such that there is a 40 dB reduction in intensity from the intensity at the center of ridge 412 at ten micrometers from the center of ridge 412. For example, the height of ridge 412 is on the order of a few hundred nanometers in some cases. However, other heights are possible in other embodiments.

A portion of waveguide 410' is proximate to electrodes 420 and 430 along the direction of transmission of the optical signal (e.g. from the input of the optical signal through waveguide 410' to the modulated optical signal output). The portion of waveguide 410' proximate to electrodes 420 and 430 may the lengths described above, for example a length greater than two millimeters in some embodiments, and greater than two or more centimeters in some such embodiments. Such lengths are possible at least in part because of the low optical losses per unit length for waveguide 410 described above. Further, the portion of waveguide 410' proximate to electrodes 420 and 430 has an optical mode cross-sectional area that is small, as described above for waveguide 410.

Electrodes 420' and 430' apply electric fields to waveguide 410. Electrode(s) 420' and/or 430' may be fabricated using deposition techniques, such as electroplating, and photolithography to shape the electrode 420 and/or 430. The resulting electrode 420' and/or 430' may have a lower frequency dependent electrode loss, in the ranges described above with respect to electrodes 420 and 430. Electrode 420' includes a channel region 422' and extensions 424' (of which only one is labeled in FIG. 4B). Electrode 430' includes a channel region 432' and extensions 434' (of which only one is labeled in FIG. 4B). In some embodiments, extensions 424' or 434' may be omitted from electrode 420' or electrode 430', respectively. Extensions 424' and 434' are closer to waveguide 410' than channel region 422' and 432', respectively, are. For example, the distance, s, from extensions 424' and 434' to waveguide ridge 412 is less than the distance w from channels 422' and 432' to waveguide ridge 412. In the embodiment shown in FIG. 4B, extensions 424' and 434' are at substantially the same level as channel regions 422' and 432', respectively. In some embodiments, the extensions may protrude above and/or below the channel regions in addition to or in lieu of being at the same level.

Extensions 424' and 434' are in proximity to waveguide 410'. For example, extensions 424' and 434' are a vertical distance, d, from the thin film portion 414 of waveguide 410'. The vertical distance to waveguide 410' may depend upon the cladding (not shown in FIG. 4B) used. The distance d is highly customizable in some cases. For example, d may range from zero (or less if electrodes 420' and 430' contact or are embedded in thin film portion 414) to greater than the height of ridge 412. However, d is generally still desired to be sufficiently small that electrodes 420' and 430' can apply the desired electric field to waveguide 410'. Extensions 424' and 434' are also a distance, s, from ridge 412. Extensions 424' and 434' are desired to be sufficiently close to waveguide 410' (e.g. close to ridge 412) that the desired electric field and index of refraction change can be achieved. However, extensions 424' and 434' are desired to be sufficiently far from waveguide 410' (e.g. from ridge 412) that their presence does not result in undue optical losses. Although the distance s is generally agnostic to specific geometry or thickness of waveguide 410', s may be selected to allow for both transverse electric and transverse optical modes that are confined differently in waveguide 410'. However, the optical field intensity at extensions 424' and 434' (and more at particularly sections 424B and 434B) is desired to be reduced to limit optical losses due to absorption of the optical field by the conductors in extensions 424' and 434'. Thus, s is sufficiently large that the total optical loss for waveguide 410', including losses due to absorption at extensions 424' and 434', is not more than the ranges described above (e.g. 40 dB or less in some embodiments, 8 dB or less in some embodiments, 4 dB or less in some embodiments). In some embodiments, s is selected so that optical field intensity at extensions 424' and 434' is less than −10 dB of the maximum optical field intensity in waveguide 410. 'In some embodiments, s is chosen such that the optical field intensity at extensions 424' and 434' is less than −40 dB of its maximum value in the waveguide. For example, extensions 424' and/or 434' may be at least two micrometers and not more than 2.5 micrometers from ridge 412 in some embodiments. In some embodiments, the extensions 424' and 434' may be closer than the width of ridge 412 (i.e. the distance s<0). In such embodiments, at least extensions 424' and 434' may be above (d >ridge height) or below waveguide 410'.

In the embodiment shown in FIG. 4B, extensions 424 have a connecting portion 424A and a retrograde portion 424B. Retrograde portion 424B is so named because a part of retrograde portion may be antiparallel to the direction of signal transmission through electrode 420. Similarly, extensions 434 have a connecting portion 434A and a retrograde portion 434B. Thus, extensions 424 and 434 have a "T"-shape. In some embodiments, other shapes are possible. For example, extensions 424 and/or 434 may have an "L"-shape, may omit the retrograde portion, may be rectangular, trapezoidal, parallelogram-shaped, may partially or fully wrap around a portion of waveguide 410, and/or have another shape. Similarly, channel regions 422' and/or 432', which are shown as having a rectangular cross-section, may have another shape. Further, extensions 424' and/or 434' may be different sizes, as indicated by FIG. 4A. Although all extensions 424' and 434' are shown as the same distance from ridge 412, some of extensions 424' and/or some of extensions 434' may be different distances from ridge 412. Channel regions 422' and/or 432' may also have a varying size. In some embodiments, extensions 424' and 434', respectively, are desired to have a length, l (e.g. l=w−s), that corresponds to a frequency less than the Bragg frequency of the signal for electrodes 420' and 430', respectively. Thus, the length of extensions 424' and 434' may be desired to be not more than the microwave wavelength of the electrode signal divided by π at the highest frequency of operation for electrodes 420' and 430'. In some embodiments, the length of extensions 424' and 434' is desired to be less than the microwave wavelength divided by twelve. For example, if the maximum operation frequency is 300 GHz, which corresponds to a microwave wavelength of 440 micrometers in the substrate, extensions 424' and 434' are desired to be at smaller than approximately 37 micrometers. Individual extensions 424' and/or 434' may be irregularly spaced or may be periodic. Periodic extensions have a constant pitch. In some embodiments, the pitch, p, is desired to be a distance corresponding to a frequency that is less than the Bragg frequency, as discussed above with respect to the length of extensions 424' and 434'. Thus, the pitch for extensions 424' and 434' may be desired to be not more than the microwave wavelength of the electrode signal divided by π at the highest frequency of operation for electrodes 420' and 430'. In some embodiments, the pitch is desired to be less than the microwave wavelength divided by twelve. In some embodiments, the pitch is desired to be less than the microwave wavelength divided by seventy two, allowing for a low ripple in group velocity. The segments may also be narrow in some embodiments. For example, the width (l −d2) of retrograde portion 434B and connecting portion 434A may be not more than one micrometer. In some embodiments, the widths of retrograde portion 434B and connecting portion 434A is not more than five hundred nanometers. In some embodiments, this width is not more than three hundred nanometers. In some embodiments, this width is at least fifty nanometers.

Extensions 424' and 434' are closer to ridge 412 than channels 422' and 432', respectively, are (e.g. s<w). In some embodiments, a dielectric cladding (not explicitly shown in FIG. 4B) resides between electrodes 420' and 430' and waveguide 410'. As discussed above, extensions 424' and 434' are desired to have a length (w-s) that corresponds to a frequency less than the Bragg frequency of the signal for electrodes 420' and 430', respectively. Extensions 424' and 434' are also desired to be spaced apart from ridge 412 as indicated above (e.g. such that the absorption loss in waveguide 410' can be maintained at the desired level, such as 40 dB or less). The length of the extensions 424' and 434' and desired separation from ridge 412 (e.g. s) are considered in determining w. Although described in the context of a horizontal distance for FIGS. 4A-1C, the distance between electrode structures and the waveguide also applies for vertical configurations. Other distances between waveguide 410/ridge 412 and channel regions 422 and/or 432 are possible.

The geometries of electrodes 420' and 430' are analogous to that described with respect to electrodes 420 and 430. The sizes of particular portions of extensions 424' and 434' may be varied. For example, the length, d2, of connecting portion 424A and/or 434A may be selected so that the impedance of the electrode 420' and 430' respectively, is matched to that of a driver (not shown), e.g. 50Ω. In some embodiments, the gap between extensions 434' and 424' (in which waveguide ride 412 resides) may be configured to increase the electric field at waveguide ridge 412. In some embodiments, the gap between extensions 424' and 434' is at least one and not more than ten multiplied by the optical wavelength of the optical signal carried by waveguide 410'. However, too small a gap may cause current crowding and microwave loss in the electrode(s) 420' and/or 430'. In some embodiments, the width of a channel region 422' and/or 432' is selected to reduce microwave losses while attempting to match the microwave (electrode signal) velocity the optical signal velocity in waveguide 410. For example, electrode channel region 422' and/or 432' may have a width of at least two micrometers and not more than five hundred micrometers. The width of the retrograde portions 424B and/or 434B segments may be fine-tuned to allow low microwave losses while maintaining velocity matching and high frequency response range. For example, retrograde portions 424B and/or 434B may have a width (l–d2) of at least ten nanometers and not more than ten micrometers. The length, d3, of each retrograde portions 424B and/or 434B and the gap between adjacent retrograde portions 424B and/or 434 are chosen to allow efficient modulation and low microwave loss. For example, a duty cycle d3/(d3+d4) of at least 0.5 and not more than 0.9999 may be chosen in some embodiments. Other dimensions, including but not limited to those described herein, may be selected in some embodiments.

Optical device 400' operates in an analogous manner to optical device 400. Thus, optical device 400' may share the benefits of optical device 400. Use of nonlinear optical materials in waveguide 410' and the configuration of waveguide 410' (e.g. smoother sidewalls of ridge 412) may not only increase the electro-optic effect (e.g. provide for larger modulations in index of refraction), but also reduce optical losses. Consequently, a longer waveguide 410, larger total change in index of refraction and thus an enhanced modulation of the optical signal may be achieved. Use of electrodes 420' and 430' having extensions 424' and 434', respectively, may reduce microwave losses, allow for a large electric field at waveguide 410'/ridge 412 and improve the propagation of the microwave signal through electrodes 420' and 430', respectively. Consequently, performance of optical device 400' may be significantly enhanced.

This improvement in performance may be achieved for optical devices (e.g. 400 and/or 400') in which waveguide 410 and/or 410' includes or consists of electro-optic materials that have a microwave dielectric constant significantly exceeding the optical dielectric constant, when used at the design microwave and optical frequencies. Here for nonmagnetic materials, optical index is equal to or about the square root of the optical dielectric constant. For electro-optic materials in which the microwave dielectric constant significantly exceeds the optical dielectric constant (e.g. LN and LT), the microwave dielectric constant is at least 4.5 multiplied by the optical dielectric constant. In some cases, the microwave dielectric constant is at least 2 multiplied by the optical dielectric constant. In some instances, the microwave dielectric constant is at least 5 multiplied by the optical dielectric constant. In some such materials, the microwave dielectric constant is at least 40 multiplied by the optical dielectric constant. In some embodiments, therefore, the waveguide 410' including (or consisting of) such materials has a microwave dielectric constant that exceeds the optical dielectric constant (e.g. by a factor of at least 4.5, 2, 5, 40 or more). The optical dielectric constant and microwave dielectric constant affect the speed of transmission of the optical and microwave signals, respectively. The higher the optical dielectric constant, the lower the speed of transmission of the optical signal. Similarly, the higher the microwave dielectric constant, the lower the speed of transmission of the microwave signal.

Although the optical mode is generally well confined to the waveguide, the microwave mode may extend significantly outside of the electrodes. For example, the microwave mode may extend into the waveguide. For bulk and other optical devices including waveguides formed of materials having a microwave dielectric constant that is large in comparison to the optical dielectric constant (e.g. LN and/or LT), the speed of transmission of the microwave signal in the waveguide material is reduced to a greater degree than the speed of the optical signal. Features in the electrodes, such as extensions, may also slow the transmission of the electrode signal in the electrodes. Thus, the velocity mismatch between the optical signal and the electrode signal is expected to be exacerbated by electrodes having features such as extension. In general, use of features such as extensions is disfavored in situations in which the waveguide material has a significantly larger microwave dielectric constant than optical dielectric constant (e.g. as for bulk LN and/or LT waveguides). Stated differently, the use of features on the electrodes is generally limited to cases in which the microwave dielectric constant of the waveguide material(s) is not significantly greater (e.g. by less than a factor of 4.5), about the same as, or less than the optical dielectric constant of the waveguide material(s) (e.g. III-V compounds materials such as indium phosphide and gallium arsenide).

In contrast, for optical device 400' (and 400), thin film waveguide 410' is used. In general, the optical mode is well confined to waveguide 410' (e.g. to ridge portion 412). Referring back to FIG. 4B, the optical dielectric constant of waveguide 410' thus determines the velocity of the optical signal in waveguide 410'. However, the microwave mode for the microwave signal in electrodes 420' and/or 430' may extend over many structures. Referring back to FIG. 4B, the velocity of the microwave signal through electrodes 420' and 430' may thus be found using the microwave dielectric constant of multiple structures such as electrodes 420' and 430', waveguide 410', low dielectric constant layer 402 between substrate/underlayer(s) 401 and electrodes 420' and 430', substrate/underlayers 401, and air or any structures (not shown) above electrodes 420' and 430'. Thus, the contribution of the (large) microwave dielectric constant of waveguide 410' materials (e.g. LT and LN) may be mitigated by the (lower) microwave dielectric constant of surrounding structures. As such, the velocity mismatch between the optical signal in waveguide 410' and the electrode signal for electrode(s) 420' and/or 430' may still be mitigated while achieving the other benefits of extensions 424 and/or 454'.

Use of optical devices 400 and/or 400' in optical device(s) 100, 200, and/or 300 may further improve performance. For example, modulation of the optical signal may be improved, microwave and optical losses reduced, and velocity matching enhanced while providing a device in a compact form factor.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An optical device, comprising:
a substrate;
a plurality of optical channels, wherein the plurality of optical channels includes a first optical channel and a second optical channel, the first optical channel having a first optical channel length, the second optical channel having a second optical channel length, a plurality of Mach-Zehnder interferometers including a first Mach-Zehnder interferometer and a second Mach-Zehnder interferometer, at least one electrode being provided for each of the plurality of Mach-Zehnder interferometers, wherein at least one Mach-Zehnder interferometer of the plurality of Mach-Zehnder interferometers includes two output waveguides and one input waveguide, wherein the one input waveguide of the at least one Mach-Zehnder interferometer is optically coupled to a common optical port with another input waveguide of another Mach-Zehnder interferometer of the plurality of Mach-Zehnder interferometers, wherein the plurality of Mach-Zehnder interferometers extend in a first direction and are free of bends that provide a total direction change of at least 90 degrees, wherein one output waveguide of the two output waveguides has bends that provide a total direction change of at least 90 degrees and is configured to route the one output waveguide along the first direction between the first Mach-Zehnder interferometer and the second Mach-Zehnder interferometer without any other optical waveguide sandwiched therebetween;
a plurality of photodiodes, wherein the plurality of photodiodes includes a first photodiode and a second photodiode; and
a plurality of optical paths, wherein the plurality of optical paths includes a first optical path and a second optical path, wherein the first optical path couples the first photodiode to the first optical channel, the first optical path having a first optical path length that is at least one fourth of the first optical channel length, wherein the second optical path couples the second photodiode to the second optical channel, the second optical path having a second optical path length that is at least one fourth of the second optical channel length, wherein the plurality of photodiodes are part of a first array of photodiodes having a predetermined arrangement, wherein the plurality of optical channels are a part of a second array, wherein an entire length of one optical channel of the plurality of optical paths extends in the first direction, the first array of photodiodes being arranged in a second direction that is the same as the first direction.

2. The optical device of claim 1, wherein the substrate has a first edge and a second edge opposite to the first edge, wherein the plurality of optical channels extends along a direction between the first edge and the second edge.

3. The optical device of claim 1, wherein the first photodiode is an external photodiode, the optical device further comprising:
an output coupler optically coupled with the first optical path and the first photodiode.

4. The optical device of claim 3, wherein the output coupler further includes:
at least one of a grating coupler configured to output an optical signal in a direction out of plane to the first optical path, a spot size converter, or a photonic wire bond.

5. The optical device of claim 1, wherein the one optical channel includes at least one of lithium niobate and lithium tantalate.

6. The optical device of claim 1, further comprising:
a plurality of inputs including a first number of inputs;
a plurality of outputs including a second number of outputs; and
wherein at least one optical channel is part of the plurality of optical channels having a third number of optical channels; and
wherein at least one of the first number differs from at least one of the second number and the third number, second number differs from at least one of the first number and the third number, and the third number differs from the first number and the second number.

7. The optical device of claim 6, wherein the at least one optical channel further includes:
an electro-optic material having a thickness of at least two hundred nanometers and not more than one thousand nanometers.

8. The optical device of claim 1, wherein the substrate further includes:
a silicon substrate; and
a low microwave dielectric constant layer between the one optical channel and the silicon substrate, the low microwave dielectric constant layer having a thickness of at least four micrometers.

9. The optical device of claim 1, wherein the at least one electrode is configured to carry an electronic signal that modifies an optical signal for the one optical channel, such that the optical device has a Vp of not more than 4.5 volts for the optical signal in an electrical frequency range of 50-100 GHz.

10. The optical device of claim 1, further comprising:
a plurality of pads coupled with a plurality of optical phase shifters, at least one of the plurality of pads being shared by at least two of optical phase shifters of the plurality of optical phase shifters.

11. An optical device, comprising:
a substrate;
a plurality of optical inputs including a first optical input and a second optical input;
a plurality of optical channels including a first optical channel and a second optical channel, wherein the first optical channel is coupled to the first optical input, wherein the second optical channel is coupled to the second optical input, wherein the plurality of optical channels further includes a plurality of Mach-Zehnder interferometers including a first Mach-Zehnder interferometer and a second Mach-Zehnder interferometer, at least one electrode being provided for each of the plurality of Mach-Zehnder interferometers, wherein at least one Mach-Zehnder interferometer of the plurality of Mach-Zehnder interferometers includes two output waveguides and one input waveguide, wherein the one input waveguide is coupled to the first optical input or the second optical input, wherein the plurality of Mach-Zehnder interferometers extend in a first direction and are free of bends that provide a total direction change of at least 90 degrees, wherein one output waveguide of the two output waveguides has bends that provide a total direction change of at least 90 degrees and is configured to route the one output waveguide of the two output waveguides along the first direction between the first Mach-Zehnder interferometer and the second Mach-Zehnder interferometer, without any other optical waveguide sandwiched therebetween, to a respective photodiode of a plurality of photodiodes;

wherein the plurality of photodiodes are part of a first array of photodiodes having a predetermined arrangement, wherein the plurality of optical channels are a part of a second array and optically coupled to the plurality of photodiodes, wherein an entire length of one optical channel extends in the first direction, the first array of photodiodes being arranged in a second direction that is the same as the first direction;

wherein the optical device is configured to have a total optical loss of not more than 10 dB.

12. The optical device of claim 11, wherein the at least one electrode is configured to carry at least one electronic signal that modifies an optical signal for the one optical channel such that the optical device has a Vp of not more than 4.5 volts for the optical signal having a frequency range of 50-100 GHz.

13. The optical device of claim 12, wherein at least one optical channel has a length of at least one centimeter.

14. The optical device of claim 11, wherein the optical device is selected from a DR8 optical device having the total optical loss not exceeding 8 dB, a DR4 optical device having the total optical loss not exceeding 8 dB, an FR4 optical device having the total optical loss not exceeding 8 dB, and a DPIQ optical device having the total optical loss not exceeding 10 dB.

15. The optical device of claim 11, further comprising:
a plurality of pads coupled with a plurality of optical phase shifters, at least one of the plurality of pads being shared by at least two of optical phase shifters of the plurality of optical phase shifters.

16. A method for transmitting optical signals, comprising:
providing an optical signal to one optical channel of a plurality of optical channels of an optical device including a substrate, the one optical channel having an optical channel length, one photodiode of a plurality of photodiodes, and an optical path, the optical path having an optical path length that is at least one fourth of the optical channel length, the optical path coupling the photodiode to the one optical channel, wherein the plurality of photodiodes are part of a first array of photodiodes having a predetermined arrangement, wherein the plurality of optical channels are a part of a second array, wherein an entire length of the one optical channel extends in a first direction, the first array of photodiodes being arranged in a second direction that is the same as the first direction, wherein the plurality of optical channels includes a plurality of Mach-Zehnder interferometers including a first Mach-Zehnder interferometer and a second Mach-Zehnder interferometer, at least one electrode being provided for each of the plurality of Mach-Zehnder interferometers, wherein at least one Mach-Zehnder interferometer of the plurality of Mach-Zehnder interferometers includes two output waveguides and one input waveguide, wherein the one input waveguide of the at least one Mach-Zehnder interferometer is optically coupled to a common optical port with another input waveguide of another Mach-Zehnder interferometer of the plurality of Mach-Zehnder interferometers, wherein the plurality of Mach-Zehnder interferometers extend in a first direction and are free of bends that provide a total direction change of at least 90 degrees, wherein one output waveguide of the two output waveguides has bends that provide a total direction change of at least 90 degrees and is configured to route the one output waveguide along the first direction between the first Mach-Zehnder interferometer and the second Mach-Zehnder interferometer, without any other optical waveguide sandwiched therebetween, to a respective photodiode of the first array of photodiodes.

17. The method of claim 16, wherein the substrate has a first edge and a second edge opposite to the first edge, wherein the plurality of optical channels extends along the first direction between the first edge and the second edge.

18. The method of claim 16, wherein at least one photodiode is an external photodiode, the optical device further comprising an output coupler optically coupled with the optical path and the one photodiode.

19. The method of claim 18, wherein the output coupler further includes:
at least one of a grating coupler configured to output an optical signal in a direction out of a plane of the optical path, a spot size converter, or a photonic wire bond.

20. The method of claim 16, wherein at least one optical channel includes at least one of lithium niobate and lithium tantalate.

21. The method of claim 18, wherein at least one optical channel further includes:
an electro-optic material having a thickness of at least two hundred nanometers and not more than one thousand nanometers.

22. The method of claim 16, further comprising:
providing a plurality of pads including a shared voltage source pad for a plurality of optical phase shifters, a shared ground pad for the plurality of optical phase shifters, and a plurality of control pads, the plurality of control pads including a control pad for each of the plurality of optical channels.

* * * * *